United States Patent [19]
Rouger

[11] Patent Number: 5,939,910
[45] Date of Patent: Aug. 17, 1999

[54] DIGITAL DEVICE FOR INITIALIZING AN INTEGRATED CIRCUIT

[75] Inventor: Jean-Jacques Rouger, Nort sur Erdre, France

[73] Assignee: MHS, France

[21] Appl. No.: 08/994,193

[22] Filed: Dec. 19, 1997

[30] Foreign Application Priority Data

Dec. 20, 1996 [FR] France .................................. 96 15755

[51] Int. Cl.$^6$ ....................................................... H03L 7/00
[52] U.S. Cl. .......................................... 327/142; 327/160
[58] Field of Search ................................... 327/141, 142, 327/143, 146, 150, 151, 153, 155, 160, 161, 170, 198, 538, 540–543, 18–20

[56] References Cited

U.S. PATENT DOCUMENTS

| | | | |
|---|---|---|---|
| 4,464,584 | 8/1984 | Hentzschet et al. ..................... | 327/143 |
| 5,313,112 | 5/1994 | Macks ..................................... | 327/142 |
| 5,442,310 | 8/1995 | Bazes ...................................... | 327/143 |
| 5,513,358 | 4/1996 | Lundberg et al. .................. | 395/750.07 |
| 5,739,708 | 4/1998 | LeWalter ................................ | 327/143 |
| 5,805,403 | 9/1998 | Chemla .................................. | 361/103 |

FOREIGN PATENT DOCUMENTS

| | | |
|---|---|---|
| 515 182 | 11/1992 | European Pat. Off. . |
| 2 716 048 | 8/1995 | France . |

*Primary Examiner*—My-Trang Nu Ton
*Attorney, Agent, or Firm*—Larson & Taylor

[57] ABSTRACT

A digital device for initializing an integrated circuit supplied from a supply voltage, which comprises a module for generating a monitored clock signal including an initial phase ϕ of pre-oscillation followed by a string of periodic pulses and a module for generating a programable initialization signal receiving this monitored clock signal and makes possible to generate an initialization signal held at a true logic value for the duration of the initial phase ϕ of pre-oscillation increased by a specified number of periods of the string of periodic pulses.

5 Claims, 4 Drawing Sheets

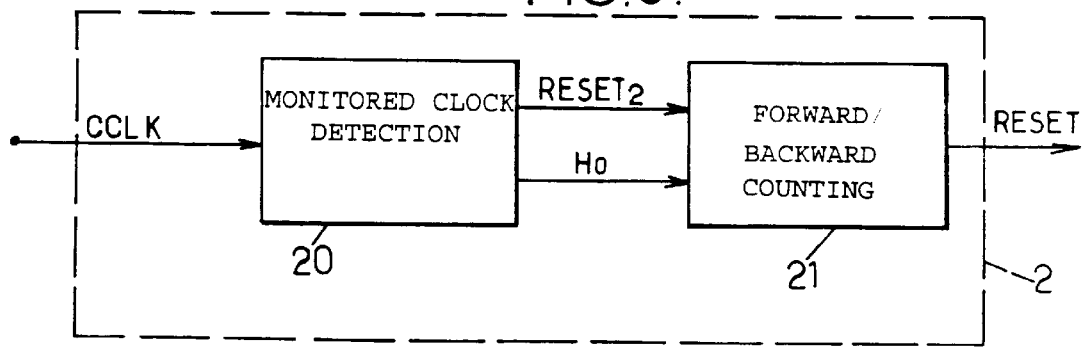
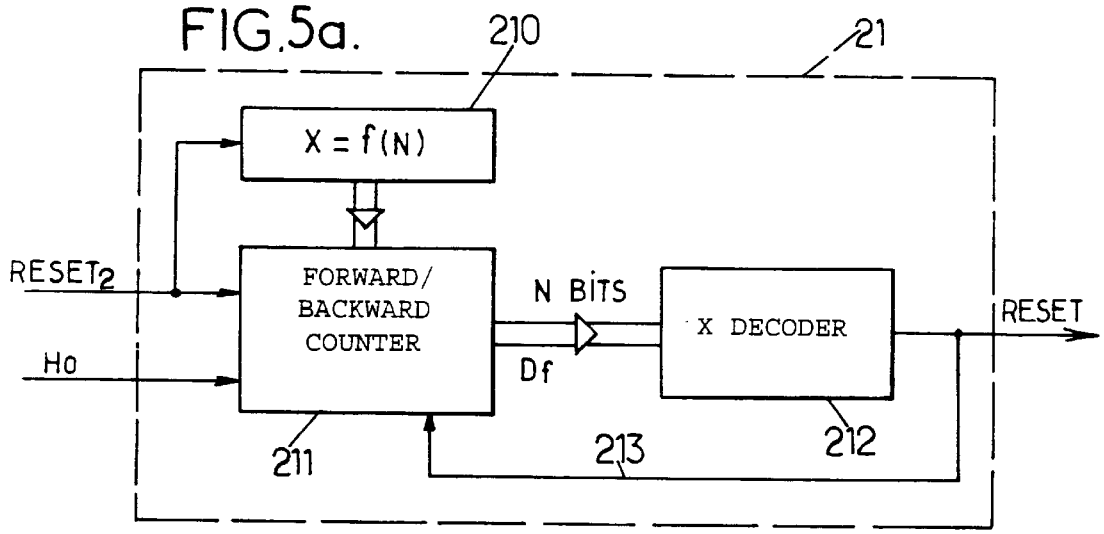
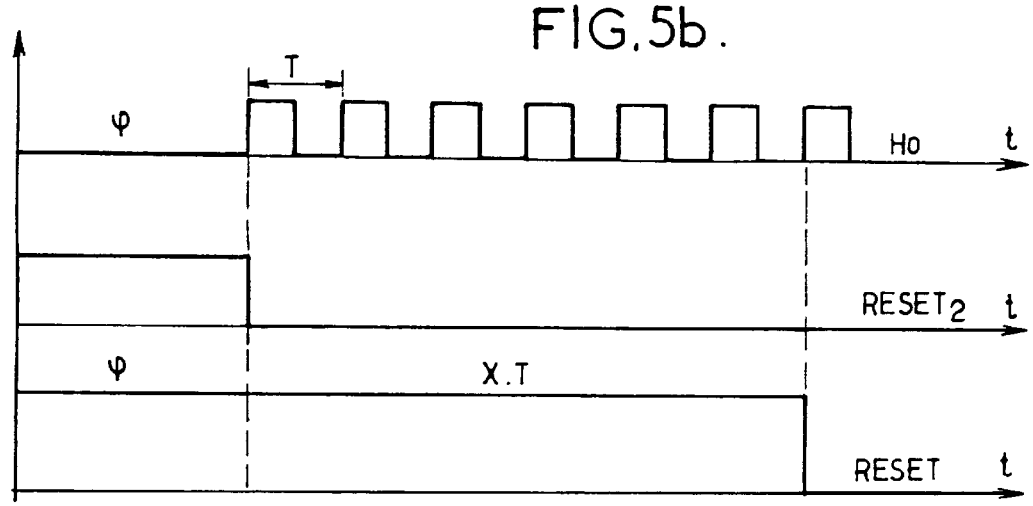

5,939,910

DIGITAL DEVICE FOR INITIALIZING AN INTEGRATED CIRCUIT

BACKGROUND OF THE INVENTION

1. Field of the Invention

The invention relates to a digital device for initializing an integrated circuit.

2. Brief Description of the Prior Art

Modern integrated circuits include, within their numerous layers of integration, a multitude of active elements allowing complex functions to be carried out.

The supplying of these active elements with power poses numerous problems, such as in particular, under steady conditions, the provision of a stable supply voltage free from too large a noise level.

Although these problems have formed the subject of numerous studies following which it has been possible to propose various solutions, another problem with the implementation of these circuits results from the existence of a disordered setup of the values of supply voltage at the various nodes of this type of circuit as well as the untimely appearance of uncalibrated clock signals during this setup period. The effect of these phenomena is to cause a malfunction of these circuits and it is necessary to provide initialization circuits permitting the effects thereof to be reduced.

Among the solutions adopted, the most conventional consist overall in detecting the instantaneous value of the supply voltage to the whole of the integrated circuit, and in then comparing this instantaneous value with one or more threshold values, so as to introduce, by way of appropriate delay circuits, adapted sequential control of the value of the supply voltage applied at nodes or essential points of the integrated circuit.

Such devices, which are known as RESET circuits, which adopt analog solutions, prove satisfactory. However, by virtue of their essentially analog character these types of devices which first and foremost involve capacitance and resistance circuits, cannot easily be subjected to an integration process actually within the integrated circuit. The silicon area expended in order to integrate such circuits is in fact prohibitive for a component or element which acts first and foremost as a passive component with regard to the integrated circuit proper.

OBJECTS OF THE INVENTION

One object of the present invention is to remedy the aforesaid drawback by employing a digital initialization device.

Another object of the present invention is also, by virtue of the digital character of the initialization circuit employed, very great ease of integration of the latter, especially in MOS technology.

Another object of the present invention is also, within the aforesaid MOS integration technology, the obtaining of a saving in silicon area expended, owing to the integration of such a function, in a ratio of 100 as compared with the aforesaid prior techniques.

The digital device for initializing an integrated circuit supplied from a supply voltage, which is the subject of the present invention, is noteworthy in that it comprises a module for generating a clock signal including an initial phase of pre-oscillations, followed by a periodic signal, and a module for generating a programable initialization signal receiving this monitored clock signal and making it possible to generate this initialization signal held at a true value for the duration of this initial phase of pre-oscillation increased by a specified number of periods of the periodic signal.

SUMMARY OF THE INVENTION

The digital device for initializing an integrated circuit, which is the subject of the invention, finds application to the construction of integrated circuits of any type, in CMOS technology.

BRIEF DESCRIPTION OF THE DRAWINGS

It will be better understood on reading the description and examining the drawings below, in which:

FIG. 3 represents a constructional detail of FIG. 1, in particular a preferred non-limiting embodiment of a module for generating the initialization signal of this device;

FIG. 4b represents a timing diagram of the signals obtained at notable points of the detection module represented in FIG. 4a;

FIG. 5a represents a particular constructional detail of a forward/backward counting module constituting the module for generating the initialization signal;

FIG. 5b represents a timing diagram of the signals obtained at notable points of the forward/backward counting module represented in FIG. 5a;

FIG. 6b represents a timing diagram of the signals obtained at notable points of the forward/backward counting module represented in FIG. 6a.

DETAILED DESCRIPTION OF THE PREFERRED EMBODIMENTS

A more detailed description of the digital device for initializing an integrated circuit, which is the subject of the present invention, will now be given in conjunction with FIG. 1 and the following figures.

Figure 1:
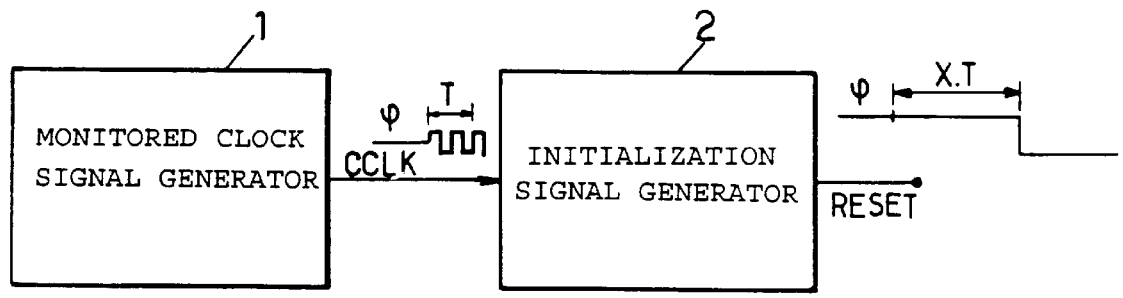
FIG. 1 represents an illustrative schematic diagram of the digital device for initializing an integrated circuit, which is the subject of the present invention.

As represented in the aforementioned FIG. 1, the digital device for initializing an integrated circuit, which is the subject of the present invention, this device and this circuit being supplied from a supply voltage, includes, in a noteworthy manner, a module 1 for generating a monitored clock signal, labelled CCLK.

In general, it is indicated that the monitored clock signal CCLK consists of an initial phase, denoted φ, termed the pre-oscillation phase, during which the module for generating the monitored clock signal 1 in fact delivers a DC voltage of given amplitude and then, following this pre-oscillation phase, a periodic signal or a square-wave signal with period T. By way of non-limiting example, it is indicated that the amplitude of the DC signal delivered during the pre-oscillation phase φ can be equal to 2.5 V for example, whereas the periodic signal exhibits a peak-to-peak amplitude of between 0 and 5 V for example.

Moreover, as represented in FIG. 1, the device which is the subject of the present invention includes a module 2 for generating a programable initialization signal, this module 2 for generating the initialization signal receiving the monitored clock signal CCLK and making it possible to generate the initialization signal proper, this signal bearing the label RESET in FIG. 1. Particularly advantageously, the initialization signal RESET is held at a true logic value for the duration of the initial pre-oscillation phase, the aforesaid phase φ, a duration increased by a specified number X of periods T of the periodic signal. As represented diagrammatically in FIG. 1, it is understood that the initialization signal therefore exhibits a true logic value for the sum of the durations of the pre-oscillation phase φ and of the X periods T of the periodic signal, whereas beyond this duration the initialization signal RESET takes the value complementary to this true logic value.

By convention, it is indicated that the true logic value corresponds for example to the peak voltage value equal to 5 V, whereas the value complementary to this true logic value corresponds to the value 0 V, that is to say to the reference voltage of the device.

It is moreover indicated that the duration of the pre-oscillation phase φ can be adjustable and can be taken equal to a value lying between 1 and 10 ms for example. As regards the value of the period T of the periodic signal, it is indicated that this signal or this string of periodic pulses can correspond to a clock signal of frequency 8 MHz for example.

A more detailed description of the module 1 for generating the monitored clock signal CCLK will now be given in conjunction with FIG. 2.

Figure 2:
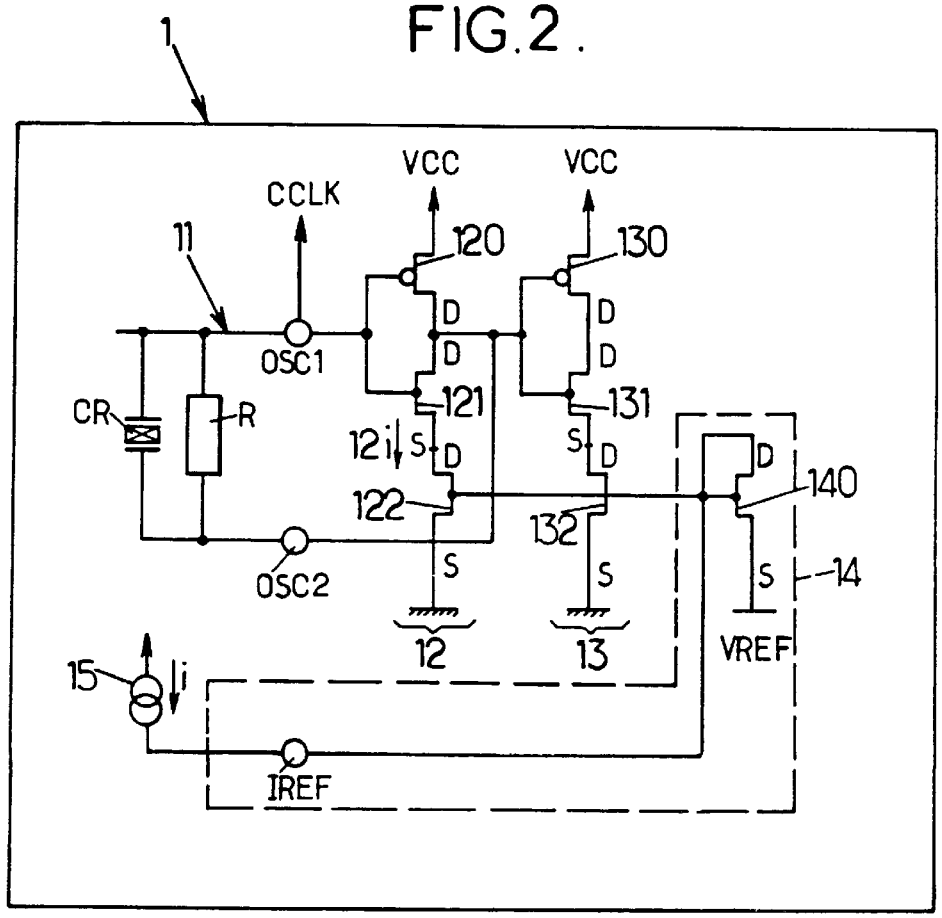
FIG. 2 represents a constructional detail of FIG. 1, in particular a preferred non-limiting embodiment of the module for generating a clock signal of this device.

As represented in the aforesaid FIG. 2, it is indicated that the generator of this monitored clock signal can comprise, in cascade, a crystal oscillator, denoted 11, including a crystal proper, labelled CR, to which is connected a resistor of very high value R of between 1 and 3 MΩ, this resistor being connected in parallel with the crystal. The module for generating the monitored clock signal 1 also includes a first stage of amplifier type, bearing the label 12, this first stage being controlled by the crystal oscillator 11 and being followed by a second stage, bearing the label 13, of bistable type, controlled in switch mode by the first stage 12.

Furthermore, a current-control stage, bearing the label 14, is also provided so as to control the current to the aforementioned first 12 and second stage 13.

The first stage 12 comprises for example a P type CMOS transistor, denoted 120, whose source electrode S is connected to the supply voltage VCC and an N type CMOS transistor, labelled 121, whose drain electrode is connected to the drain electrode D of the P type CMOS transistor bearing the label 120. The CMOS transistors 120 and 121 have their gate electrode connected in parallel and linked to a terminal, denoted $OSC_1$, of the crystal oscillator.

Furthermore, the second stage of bistable type, bearing the label 13, comprises a P type CMOS transistor, bearing the label 130, and an N type CMOS transistor labelled 131. This second stage 13 is controlled in switch mode by the first stage 12, the drain-drain common point of the first stage 12 being connected to the common gate electrode of the CMOS transistors 130 and 131 of the second aforesaid stage. The drain-drain common points are denoted DD.

As regards the current-control stage 14, the latter makes it possible to control the current to the first and to the second stage 12, 13 of bistable type by means of the same reference current, denoted IREF. This current can be delivered by adjustable current generator 15. It is recalled that this current generator may or may not be integrated with the current-control stage 14.

The current-control stage 14 comprises, as represented in the aforesaid FIG. 2, an N type CMOS transistor, labelled 140, in fact constituting a current mirror.

Finally, the first and the second stage 12, 13 are completed with an N type CMOS transistor, bearing the label 122, respectively 132, of the same type as the second transistor, and hence of type N, the transistors 121 and 131, and respectively connected in cascade with this latter via a source-drain common point, denoted SD. The gate electrode of the transistors 122 and 132 is linked to the current-control stage 14 and controlled by means of the reference current IREF. The CMOS transistors 122 and 132 have their source electrodes S connected to ground.

It is recalled that the current mirror function is obtained by connecting the drain electrode of the CMOS transistor 140 to the gate electrode of the latter, this gate electrode itself being linked to the current generator 15, as represented in FIG. 2. The gate electrode of the third transistors 122 and 132 of the first and of the second stage of bistable type 12, 13 is then linked electrically to the aforesaid current mirror, that is to say to the gate electrode of the CMOS transistor 140.

For a reference current IREF=i of given value, it is recalled that the current mirror formed imposes, in the drain circuit of the CMOS transistors 122 or 132 and ultimately in the CMOS transistors 120 and 121, respectively 130, 131, a current proportional to the reference current depending on the channel parameters of the third transistor 122, 132 of the first and of the second stage of bistable type 12, 13. The monitored clock signal CCLK can then consist of the signal delivered either to the test point OSC1, or to the test point OSC2.

French Patent Application No. 94 01512, entitled "Current-regulated oscillator", published on Aug. 11, 1995 and filed in the name of the Applicant, may be usefully referred to for a more detailed description of the module 1 for generating a monitored clock signal mentioned above.

In general, it is indicated that the duration of the pre-oscillation period φ can be adjusted as a function of the value of the reference current IREF mentioned earlier in the description, and this of course makes it possible to adjust the duration of this pre-oscillation phase to a value of between 1 and 10 ms for example.

A more detailed description of the module 2 for generating the initialization signal will now be given in conjunction with FIG. 3 and the following FIGS. 4a and 4b.

As represented in the aforesaid FIG. 3, the module 2 for generating the initialization signal RESET can advantageously comprise a module for detecting a monitored clock signal CCLK, this detection module bearing the label 20 in FIG. 3. The detection module 20 receives the monitored clock signal CCLK and delivers a monitored clock detection logic signal, labelled $RESET_2$, this signal being at the true logic value for the duration of the pre-oscillation phase, and at the value complementary to this true value beyond the aforesaid pre-oscillation phase φ. The detection module 20 also delivers a first monitored clock detection signal, denoted $H_0$, which will be described later in the description.

Moreover, the module 2 for generating the initialization signal RESET also includes a module 21 for the forward/backward counting of a specified number of pulses of the pulse string. The forward/backward counting module 21 receives, on the one hand, the monitored clock detection signal $RESET_2$ and, on the other hand, the first monitored clock detection signal $H_0$, so as to deliver the initialization signal RESET held at the true logic value for the duration of the initial phase of pre-oscillation $\phi$ increased by the specified number of periods of the string of periodic pulses.

A more detailed description of the detection module 20 and of the forward/backward counting module 21 will now be given in conjunction with FIGS. 4a, 4b and 5a, 5b.

Figure 4A:
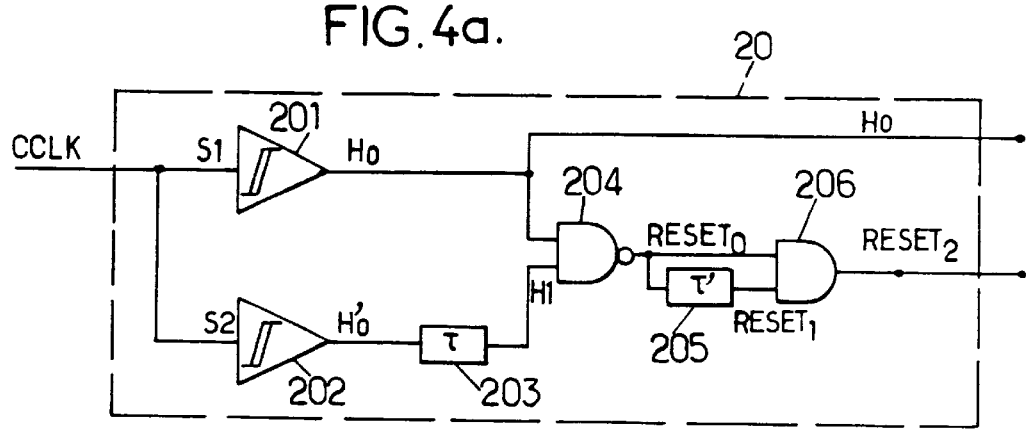
FIG. 4a represents a preferred constructional detail of a detection module constituting the module for generating the initialization signal.

As represented in FIG. 4a, the detection module 20 advantageously comprises a first trigger circuit with threshold, bearing the label 201, this first trigger circuit with threshold consisting for example of a Schmitt trigger type circuit. The trigger circuit with threshold 201 is a circuit of conventional type, and, therefore, will not be described in detail. It is merely indicated that the threshold value $S_1$ is chosen at a value greater than the amplitude value of the monitored clock signal CCLK during the pre-oscillation phase of the latter. Thus, for a DC voltage delivered during the pre-oscillation phase equal for example to 2.5 V, it is indicated that the threshold value $S_1$ can be chosen at 3.5 V for example. The trigger circuit with threshold 201 delivers the first monitored clock detection signal, denoted $H_0$, this signal being at the true logic value when the monitored clock signal CCLK is greater than the first threshold value $S_1$ and a value complementary to this true value when the monitored clock signal CCLK is less than this first aforesaid threshold value $S_1$.

Figure 4B:
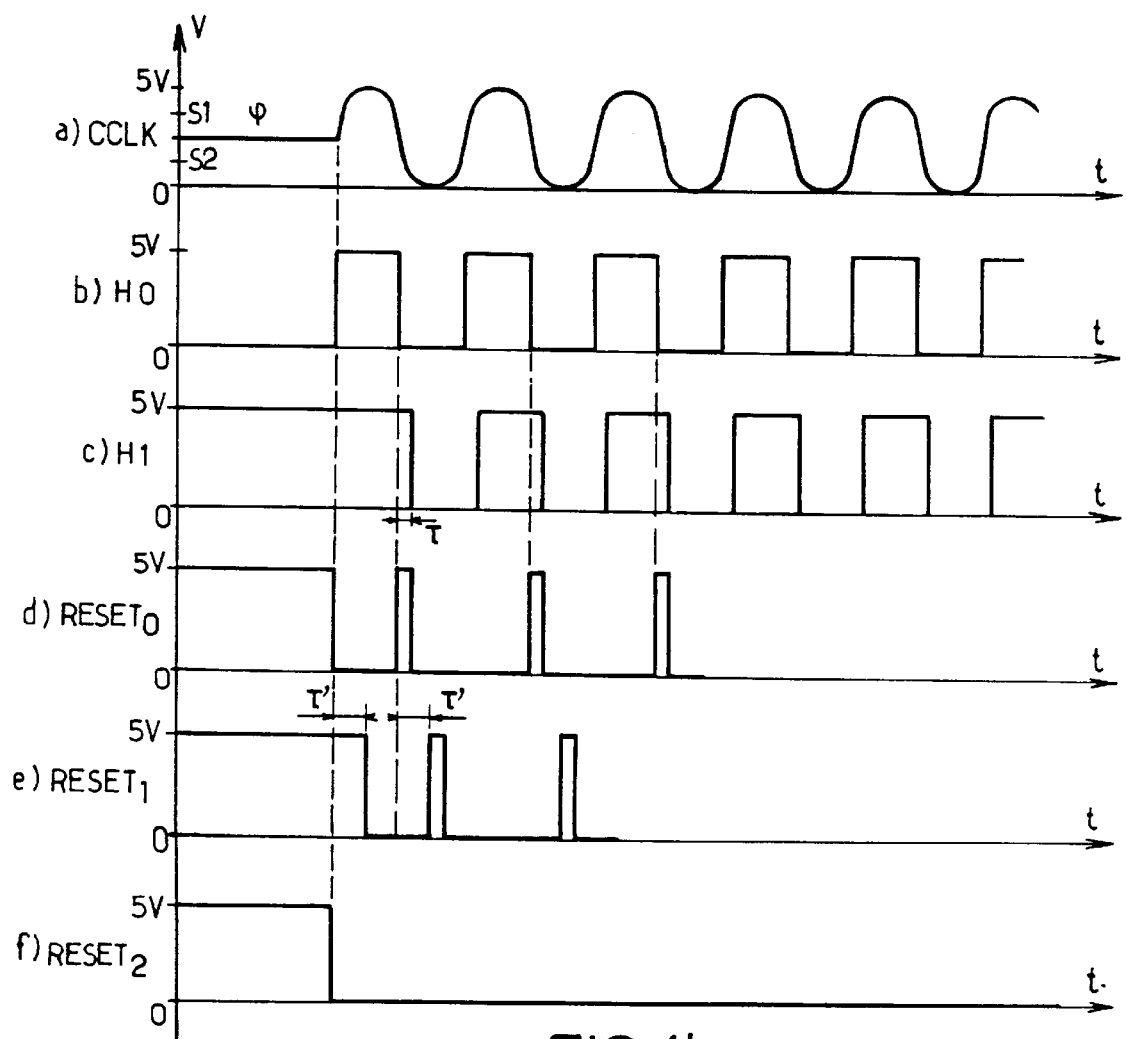

The monitored clock signal CCLK and the corresponding first monitored clock detection signal $H_0$ are represented in FIG. 4b at the points a) and b) respectively.

The detection module 20 also comprises a second trigger circuit with threshold 202, of the same type as the first trigger circuit with threshold 201 but whose threshold value $S_2$ is less than the amplitude value of the monitored clock signal CCLK during the pre-oscillation phase of the latter. By way of non-limiting example, it is indicated that the threshold value $S_2$ can be chosen equal to 1.6 V for the corresponding values of voltage amplitude equal to 2.5 V of the continuous monitored clock signal CCLK delivered during the pre-oscillation phase $\phi$. The second trigger circuit with threshold 202 delivers a second monitored clock detection signal, denoted $H'_0$, which has the true logic value when the monitored clock signal CCLK is less than the second threshold value $S_2$ and has a value complementary to this true logic value when the monitored clock signal CCLK is greater than the second threshold value $S_2$.

The detection circuit 20 also includes a NAND logic gate, bearing the label 204, as well as a first delayer circuit, bearing the label 203, which delivers a second delayed monitored clock detection signal, denoted $H_1$, delivered to the NAND logic gate 204. The NAND logic gate 204 then delivers an intermediate logic signal, labelled $RESET_0$, which has the true value when one out of the first monitored clock detection signal $H_0$ and second delayed monitored clock detection signal $H_1$ has the true value, and this same intermediate logic signal has the value complementary to this true value when the first monitored clock detection signal $H_0$ and the second delayed monitored clock detection signal $H_1$ have the same logic value. The shape of the corresponding signals is represented at the point d) of FIG. 4b where the intermediate logic signal $RESET_0$ is thus formed by a DC voltage at the peak value 5 V, the true logic value during the pre-oscillation phase $\phi$ followed by a series of pulses whose duration is equal to the duration of delay $\tau$ introduced by the delay circuit 203, this series of pulses being delivered of course at the frequency or at the period T of the series of pulses making up the monitored clock signal CCLK.

As will be observed moreover in FIG. 4a, the detection circuit 20 also includes an AND logic gate 206, and a second delayer circuit 205 whose delay value $\tau'$ is greater than that introduced by the first delayer circuit 203. The AND logic gate 206 receives the abovementioned intermediate logic signal $RESET_0$ directly and a delayed intermediate logic signal, delivered from the intermediate logic signal $RESET_0$ by way of the second delayer circuit 205, this delayed intermediate logic signal being labelled $RESET_1$. The AND logic gate 206 thus delivers a clock detection logic signal, labelled $RESET_2$ in FIG. 4a. The shape of the signals $RESET_1$ delivered by the second delay circuit 205 and by the AND logic gate 206, the signal $RESET_2$, is given at the points e) and f) of FIG. 4b. As regards the delayed intermediate logic signal $RESET_1$, it is indicated that the latter corresponds to the intermediate logic signal $RESET_0$ shifted by the delay value $\tau'$ introduced by the delay circuit 205. In a practical embodiment, it is indicated that when the first delay circuit 203 introduces a delay value $\tau$ equal to 1 ns for example, the circuit 205 is chosen in such a way as to introduce a delay $\tau'$ equal to 20 ns for example.

As regards the clock detection logic signal $RESET_2$, it is indicated that the latter in fact corresponds to a logic signal at the true logic value during the pre-oscillation phase $\phi$, that is to say for the corresponding duration thereof, and at the value complementary to the true value thereafter.

The clock detection logic signal $RESET_2$ previously described is then delivered with the first monitored clock detection signal $H_0$ to the forward/backward counting module 21, which makes it possible to count backwards a number X of periods of the aforementioned monitored clock signal so as to generate the initialization signal, as will be described later in a particular non-limiting embodiment of the forward/backward counting module 21, in conjunction with FIGS. 5a and 5b.

As represented in FIG. 5a, the forward/backward counting module 21 comprises, in order to carry out the forward/backward counting of a specified number of pulses, a forward/backward counter proper 211, this forward/backward counter being programable by way of a programing circuit 210. The forward/backward counter 211 receives on a first counting trigger input the clock detection logic signal, labelled $RESET_2$, and on a counting input the first monitored clock detection signal $H_0$ generated by the aforementioned detection circuit 20. The forward/backward counter 211 delivers a final forward/backward count value, denoted Df, which is equal to the programed value delivered by the circuit 210, this programed value X being for example coded on N bits.

Furthermore, the forward/backward counting module 21 comprises a decoder circuit 212, also programable via a programed decoding value, this programed decoding value being denoted X and equal to the programed forward/backward count value of the forward/backward counter 211. The programable decoder 212 receives the final forward/backward count value Df delivered by the forward/backward counter 211 and, when the final forward/backward count value Df coincides with the programed decoding value X, delivers on an output the initialization signal RESET which, held at the true value for the duration of the initial pre-oscillation phase $\phi$, is increased by this same true value for a duration equal to the specified number X of periods, the initialization signal RESET having a value complementary to this true value beyond this duration.

Furthermore, a latching circuit 213 is provided which allows the interconnecting of the output of the decoder 212 to a latching input of the forward/backward counter 211 so as to halt the forward/backward count when the forward/backward count value reaches the programed final forward/backward count value Df.

The various signals input to and output from the forward/backward counting circuit 21 are represented in FIG. 5b, in particular the initialization signal RESET held at the true logic value for the pre-oscillation duration $\phi$ increased by a number X of periods of the string of pulses of periods T, this signal being held at the true logic value for a duration $\phi$+X.T and at the value complementary to this true logic value thereafter.

The embodiment of the forward/backward counting module 21 as represented in FIG. 5a is not limiting.

In particular, in a preferred embodiment, it is indicated that the digital device for initializing an integrated circuit, which is the subject of the present invention, makes it possible to carry out sequential initialization of various operationally independent areas of the corresponding integrated circuit, it being understood that a successive initialization of these areas is of interest in the overall initialization of the circuit concerned.

Figure 6A:
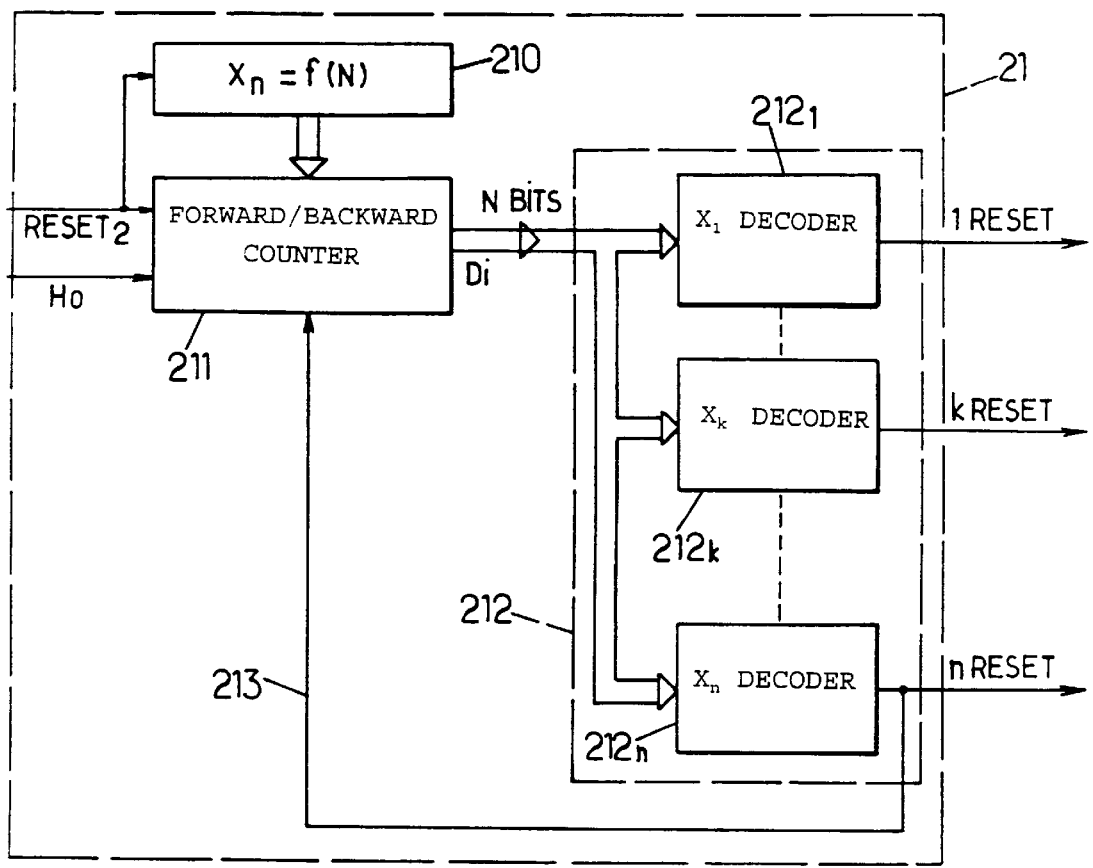
FIG. 6a represents a constructional detail of a preferred forward/backward counting module making it possible to generate several successive initialization signals and a programable sequential initialization of an integrated circuit.

Therefore, FIG. 6a represents a forward/backward counting circuit 21 in which the same labels represent the same elements as in the case of FIG. 5a.

However, the decoder circuit 212 of FIG. 5a is, in FIG. 6a, replaced by a plurality of elementary decoder circuits linked by a BUS link to the forward/backward counter 211. The elementary decoders are labelled $212_1$, $212_k$ to $212_n$.

Of substantially similar structure, the forward/backward counting circuit 21 represented in FIG. 6a exhibits from the operational point of view, as compared with the same circuit represented in FIG. 5a, the following differences:

the forward/backward counter 211, instead of delivering the final forward/backward count value Df, in fact delivers, in the embodiment of FIG. 6a, the set of forward/backward count values from the initial value up to the final forward/backward count value Df, this set of forward/backward count values being denoted in FIG. 6a by the current forward/backward count value $D_i$. These forward/backward count values are of course coded on N bits. The circuit for programing the final backward count value 210 fulfils a function identical to the corresponding circuit of FIG. 5a;

each element to be decoded to $212_1$, $212_k$, $212_n$ is then programed with a programed decoding value which is specific to it, these values accordingly being denoted $X_1$, $X_k$ to $X_n$. The current forward/backward count value $D_i$ is thus delivered to all the elementary decoders in parallel and, when the current forward/backward count value $D_i$ reaches the programed decoding value $X_1$, $X_k$ respectively, $X_n$, each elementary decoder $212_1$, $212_k$ to $212_n$ successively delivers, when the current forward/backward count value $D_i$ reaches the corresponding programed decoding value $X_1$, $X_k$ to $X_n$, a corresponding elementary initialization signal, respectively denoted 1RESET, kRESET and nRESET.

Figure 6B:
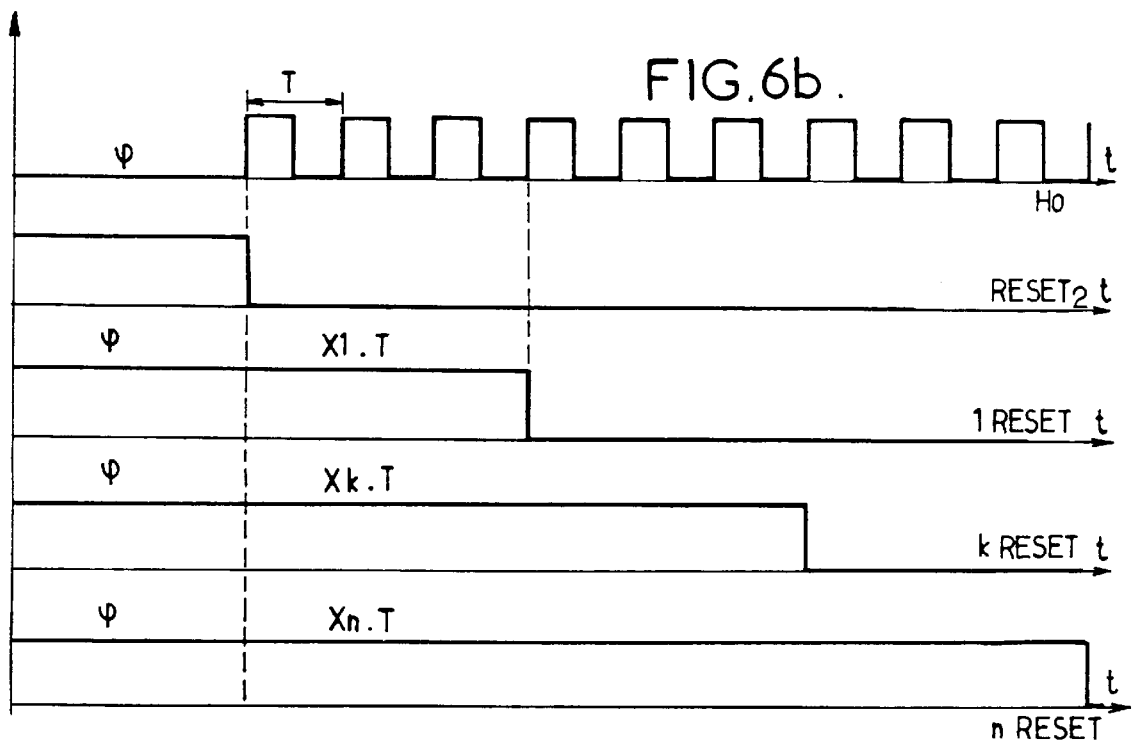

The shape of the corresponding elementary initialization signals is represented in FIG. 6b. Each elementary initialization signal corresponds to a signal at the true logic value for the duration of the initialization phase $\phi$ increased as a function of the programed decoding value $X_1$, $X_k$, $X_n$ by the product of each programed decoding value and the period T of the string of pulses making up the first monitored clock detection signal $H_0$, each elementary initialization signal having the value complementary to the true logic value thereafter.

Furthermore, the latching circuit 213 is held, it being understood however that the latter may consist solely of a circuit relaying the output of that elementary decoder $212_n$ for which the programed decoding value $X_n$ is largest, to the latching input of the forward/backward counter 211.

A digital device for initializing an integrated circuit has thus been described which is of especially high performance, on the one hand, by virtue of the flexibility of the shape of the initialization signals which can be generated by virtue of the programable character of this device, and on the other hand, by virtue of the fact that the set of elements making up this device can be constructed in integrated circuit form in CMOS technology by means of essentially digital elements with a saving of expended silicon area in a ratio of the order of 100 as compared with the analog type circuits of the prior art.

I claim:

1. A digital device for initializing an integrated circuit supplied from a supply voltage, this device including means for generating a monitored clock signal including an initial phase of pre-oscillation followed by a periodic signal, and means for generating a programmable initialization signal receiving said monitored clock signal, wherein said means for generating a monitored clock signal includes a current-regulated oscillator including in cascade:

a crystal oscillator, a first stage of amplifier type controlled by said crystal oscillator and a second stage of bistable type controlled in switch mode by said first stage, and a control stage for controlling the current to said first and second stage through a reference current;

and wherein said means for generating a programmable initialization signal generates a programmable initialization signal held at a true logic value for the duration of said initial phase of pre-oscillation increased by a specified number of periods of said periodic signal.

2. The device of claim 1, wherein said means for generating a programmable initialization signal comprises:

a detection module receiving said monitored clock signal and delivering, on the one hand, a monitored clock detection logical signal at the true logic value for the duration of said initial phase of pre-oscillation and at the value complementary to this true value beyond said pre-oscillation phase, and, on the other hand, a first monitored clock detection signal, a module for forward/backward counting of a specified number of pulses receiving, on the one hand, said monitored clock detection signal delivered by said detection module and, on the other hand, said first monitored clock detection signal and delivering said programmable initialization signal held at the true value for the duration of the initial phase increased by said specified number of periods of a string of periodic pulses of said periodic signal.

3. The device of claim 2, wherein said detection module includes:

a first trigger circuit with threshold receiving said monitored clock signal and whose threshold value constituting a first threshold value is greater than the amplitude value of said monitored clock signal during the initial phase of pre-oscillation of said monitored clock signal, said first trigger circuit with threshold delivering said first monitored clock detection signal at a true logic value when said monitored clock signal is greater than said first threshold value and at a value complementary to said true value when said monitored clock signal is less than said first threshold value;

a second trigger circuit with threshold receiving said monitored clock signal and whose threshold value constituting a second threshold value is less than the amplitude value of said monitored clock signal during the latter's pre-oscillation phase, said second trigger circuit with threshold delivering a second monitored clock detection signal at the true logic value when said monitored clock signal is less than said second threshold value and at a value complementary to said true value when said monitored clock signal is greater than said second threshold value;

a NAND logic gate and a first delay unit, each receiving said first and second monitored clock detection signal respectively, said first delay unit delivering a second delayed monitored clock detection signal, said NAND logic gate receiving said second delayed monitored clock detection signal and delivering an intermediate logic signal at the true value when one of the first respectively second delayed monitored clock detection signals is at the true value and this intermediate logic signal at the value complementary to this true value when said first clock detection signal and said second delayed monitored clock detection signal have the same logic value;

an AND logic gate and a second delay unit producing a delay of greater value than that of said first delay unit, receiving said intermediate logic signal directly, said second delay unit delivering a delayed intermediate logic signal, said AND logic gate moreover receiving said delayed intermediate logic signal and delivering said clock detection logic signal.

4. The device of claim 2, wherein said module for forward/backward counting of a specified number of pulses includes:

a programmable forward/backward counter, provided with a programmable final forward/backward count value f(N), said forward/backward counter receiving on a first counting trigger input said clock detection logical signal and on a second counting input said first monitored clock detection signal generated by said clock detection module, said forward/backward counter delivering a final forward/backward count value, equal to said programmable final forward/backward count value f(N), coded on N bits;

a decoder circuit programmable via a programmed decoding value receiving said final forward/backward count value and delivering on an output said initialization signal held at a true value for the duration of said initial phase of pre-oscillation increased by the specified number of periods of the string of periodic pulses of said periodic signal;

a latch circuit delivering said initialization signal to said forward/backward counter so as to halt said forward/backward counting to said programmable final forward/backward count value f(N).

5. The device of claim 3, wherein said module for forward/backward counting of a specified number of pulses includes:

a forward/backward counter programmable via a programmed final forward/backward count value, said forward/backward counter receiving on a first forward/backward counting trigger input said clock detection logic signal and a second counting input said first clock detection signal generated by said clock detection circuit, said forward/backward counter delivering all the intermediate forward/backward count values up to said final forward/backward count value equal to said programmed value, all coded on N bits;

a plurality of programmable decoder circuits each receiving the set of intermediate forward/backward count values, each of the decoder circuits being programmed with a programmed decoding value equal to one of the values of said set of forward/backward count values and each delivering, when the forward/backward count value reaches said programmed decoding value, said initialization signal;

a latch circuit linking the output of the decoder circuit whose programmed decoding value is highest to the said forward/backward counter circuit and permitting the latching of said forward/backward counting when the forward/backward count value reaches said highest programmed decoding value.

* * * * *